US009930692B2

(12) United States Patent
Li et al.

(10) Patent No.: US 9,930,692 B2
(45) Date of Patent: Mar. 27, 2018

(54) EARLY INDICATION FOR HIGH EFFICIENCY FIELDS

(71) Applicant: Intel IP Corporation, Santa Clara, CA (US)

(72) Inventors: Qinghua Li, San Ramon, CA (US); Xiaogang Chen, Beijing (CN); Ran Shimon, Ramat Gan (IL); Robert Stacey, Portland, OR (US); Assaf Gurevitz, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 14/979,280

(22) Filed: Dec. 22, 2015

(65) Prior Publication Data

US 2016/0373961 A1 Dec. 22, 2016

Related U.S. Application Data

(60) Provisional application No. 62/195,965, filed on Jul. 23, 2015, provisional application No. 62/182,118, filed on Jun. 19, 2015.

(51) Int. Cl.
*H04W 74/00* (2009.01)
*H04W 84/12* (2009.01)

(52) U.S. Cl.
CPC ........ *H04W 74/004* (2013.01); *H04W 74/008* (2013.01); *H04W 84/12* (2013.01)

(58) Field of Classification Search
None
See application file for complete search history.

(56) References Cited

U.S. PATENT DOCUMENTS

2013/0114757 A1* 5/2013 Park .................... H04L 27/2613 375/295
2014/0348097 A1* 11/2014 Park .................... H04L 25/0226 370/329
2015/0117433 A1* 4/2015 Zhang ..................... H04L 69/22 370/338
2015/0146653 A1* 5/2015 Zhang ................... H04L 5/0041 370/329
2016/0119453 A1* 4/2016 Tian .......................... H04L 5/04 370/338
2016/0156438 A1* 6/2016 Sun ....................... H04L 5/0007 370/330
2016/0323424 A1* 11/2016 Merlin .................... H04L 69/22

* cited by examiner

*Primary Examiner* — Benjamin Lamont
(74) *Attorney, Agent, or Firm* — Alliance IP, LLC

(57) ABSTRACT

This disclosure describes methods, apparatus, and systems related to early indication system. A device may identify a high efficiency frame in accordance with a high efficiency communication standard, received from a first device, the high efficiency frame including, at least in part, one or more legacy signal fields and one or more high efficiency signal fields. The device may determine a length field included in one of the one or more legacy signal fields, wherein the length field includes an indication bit. The device may determine a position of a high efficiency short training field within the high efficiency frame based at least in part on the indication bit.

25 Claims, 12 Drawing Sheets

EARLY INDICATION FOR HIGH EFFICIENCY FIELDS

CROSS-REFERENCE TO RELATED APPLICATIONS

This application claims the benefit of U.S. Provisional Application No. 62/195,965 filed Jul. 23, 2015, and also claims the benefit of U.S. Provisional Application No. 62/182,118 filed Jun. 19, 2015 the disclosures of both are incorporated herein by reference as if set forth in full.

TECHNICAL FIELD

This disclosure generally relates to systems and methods for wireless communications and, more particularly, to usage of early indication for high efficiency fields in wireless communications.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

BRIEF DESCRIPTION OF THE DRAWINGS

FIGS. 6(*e*)-(*h*) depict illustrative schematic diagrams showing constellation types used by one or more preamble symbols, in accordance with one or more example embodiments of the present disclosure

FIG. 8(*b*) illustrates a flow diagram of illustrative process for an early indication system in accordance with one or more embodiments of the disclosure.

DETAILED DESCRIPTION

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on an IEEE 802.11 standard. In a high efficiency communication (e.g., HEW) these one or more fields may be represented by one or more OFDMA symbols. The one or more fields may be repeated in the time domain and/or the frequency domain. The repetition is meant to enhance the decoding reliability at the receiving device because receiving a field multiple time increases the accuracy of what is being received.

Example embodiments of the present disclosure relate to systems, methods, and devices for early indication system that facilitate the use of, for example an early indication bit or other repetition detection mechanism to determine a pattern of OFDMA symbols that may be sent and/or received by a device. For example, an early indication bit may be determined and set by analyzing the length field in the legacy signal field of data frames being communicated between two devices to determine a repetition of the one or more fields or the existence of other fields. In another example, the use of a constellation map to represent one or more fields may be utilized to determine a repetition of the one or more fields or the existence of other fields. A device receiving data frames from a transmitting device may enhance the decoding of the received data frames by using the early indication of the repetition or the existence of one or more fields.

Figure 1:
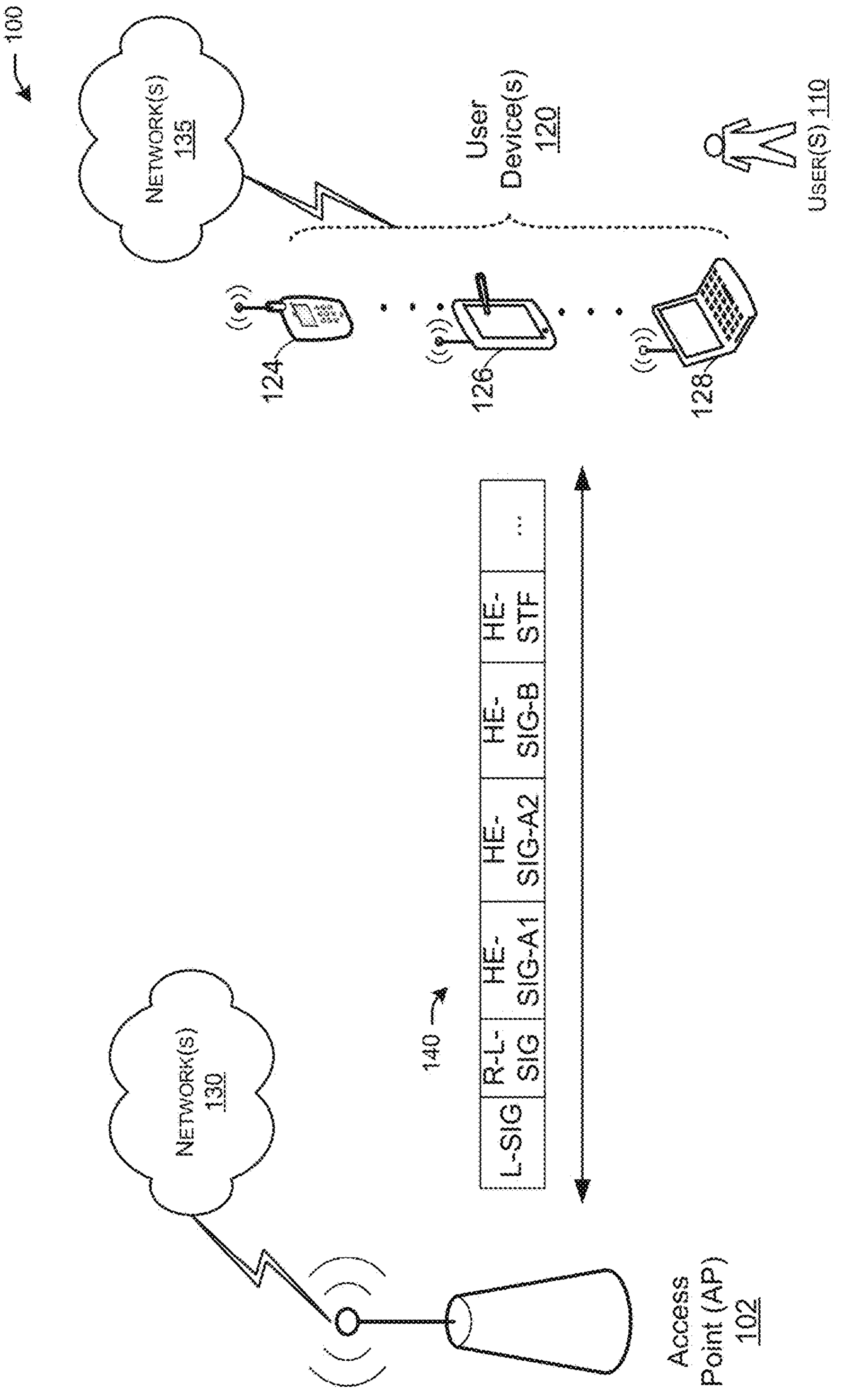
FIG. 1 depicts a network diagram illustrating an example network environment of an illustrative early indication system, according to one or more example embodiments of the disclosure.
Figure 2A:
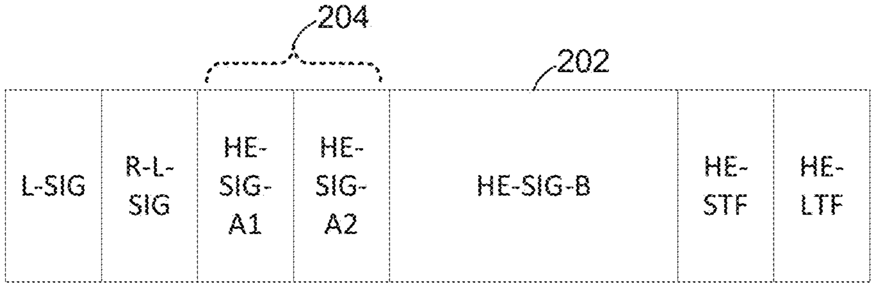
FIGS. 2(*a*)-(*d*) depict illustrative schematic diagrams of an HEW preamble composition, in accordance with one or more example embodiments of the present disclosure.
Figure 2B:
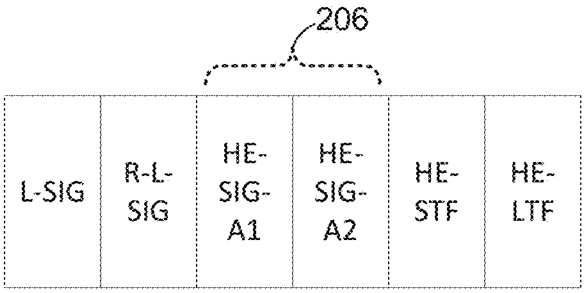
Figure 2C:
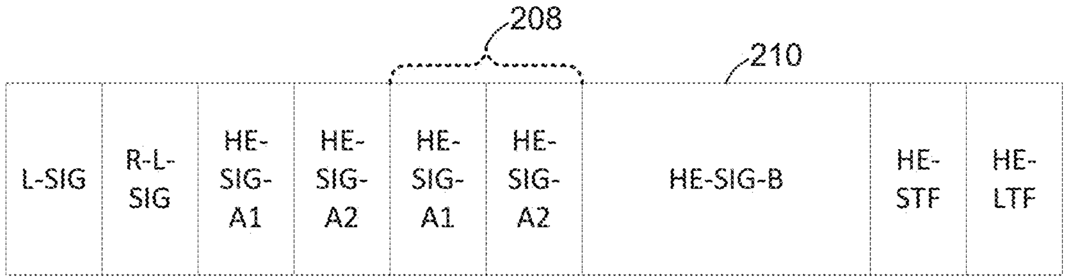
Figure 2D:
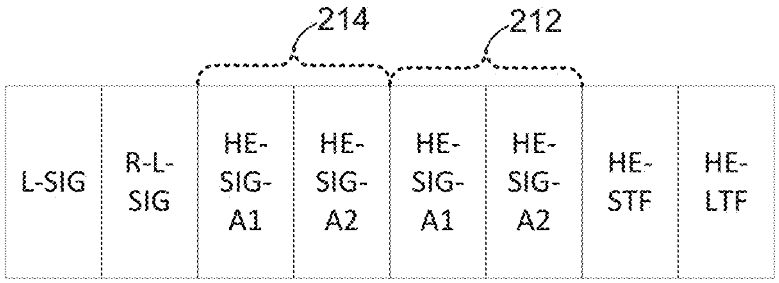

FIG. 1 is a network diagram illustrating an example network environment, according to some example embodiments of the present disclosure. Wireless network 100 can include one or more computing devices 120 and one or more access point(s) (AP) 102, which may communicate in accordance with IEEE 802.11 communication standards, including IEEE 802.11ax. The computing device(s) 120 may be mobile devices that are non-stationary and do not have fixed locations.

Figure 9:
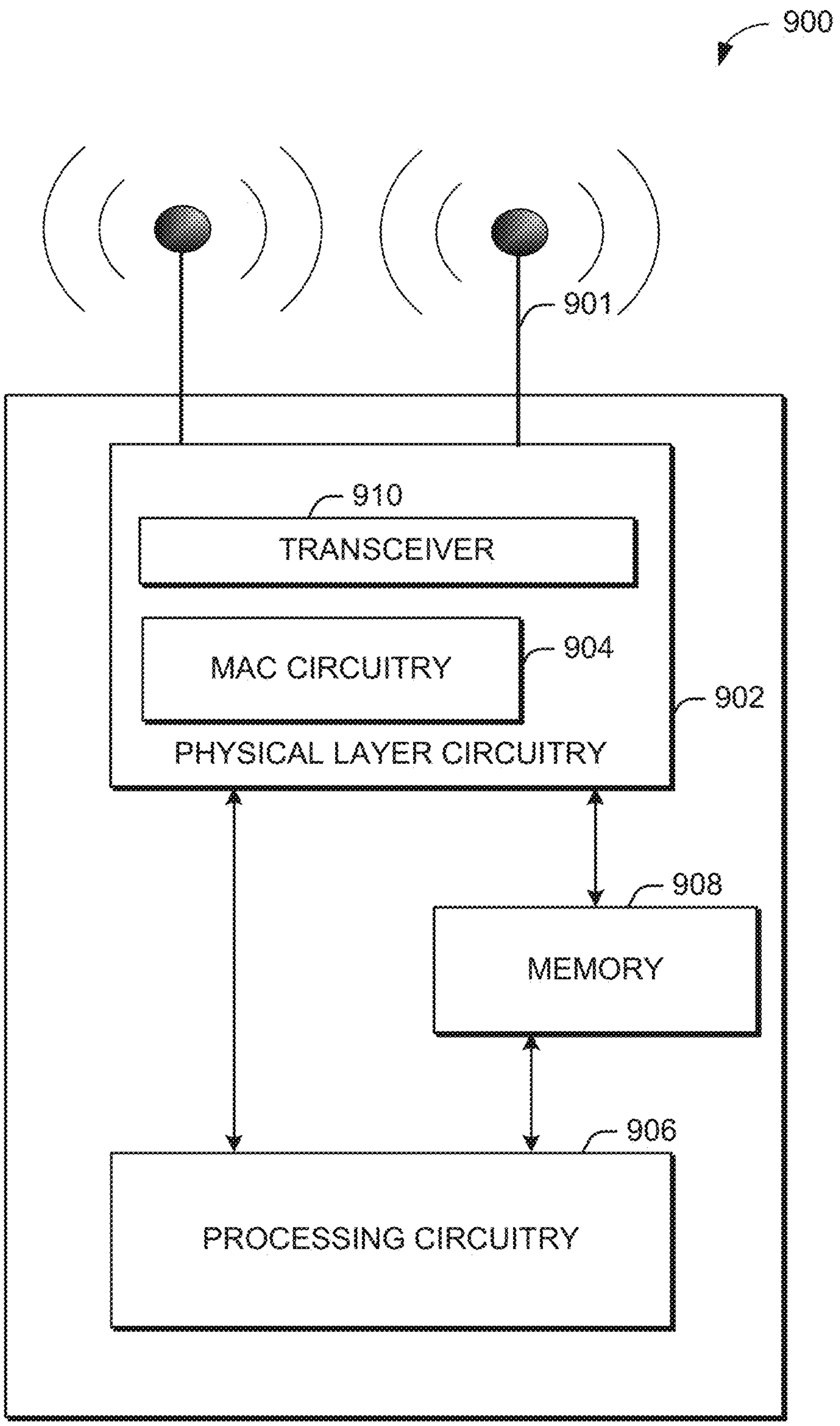
FIG. 9 illustrates a functional diagram of an example communication station that may be suitable for use as a user device, in accordance with one or more example embodiments of the disclosure.
Figure 10:
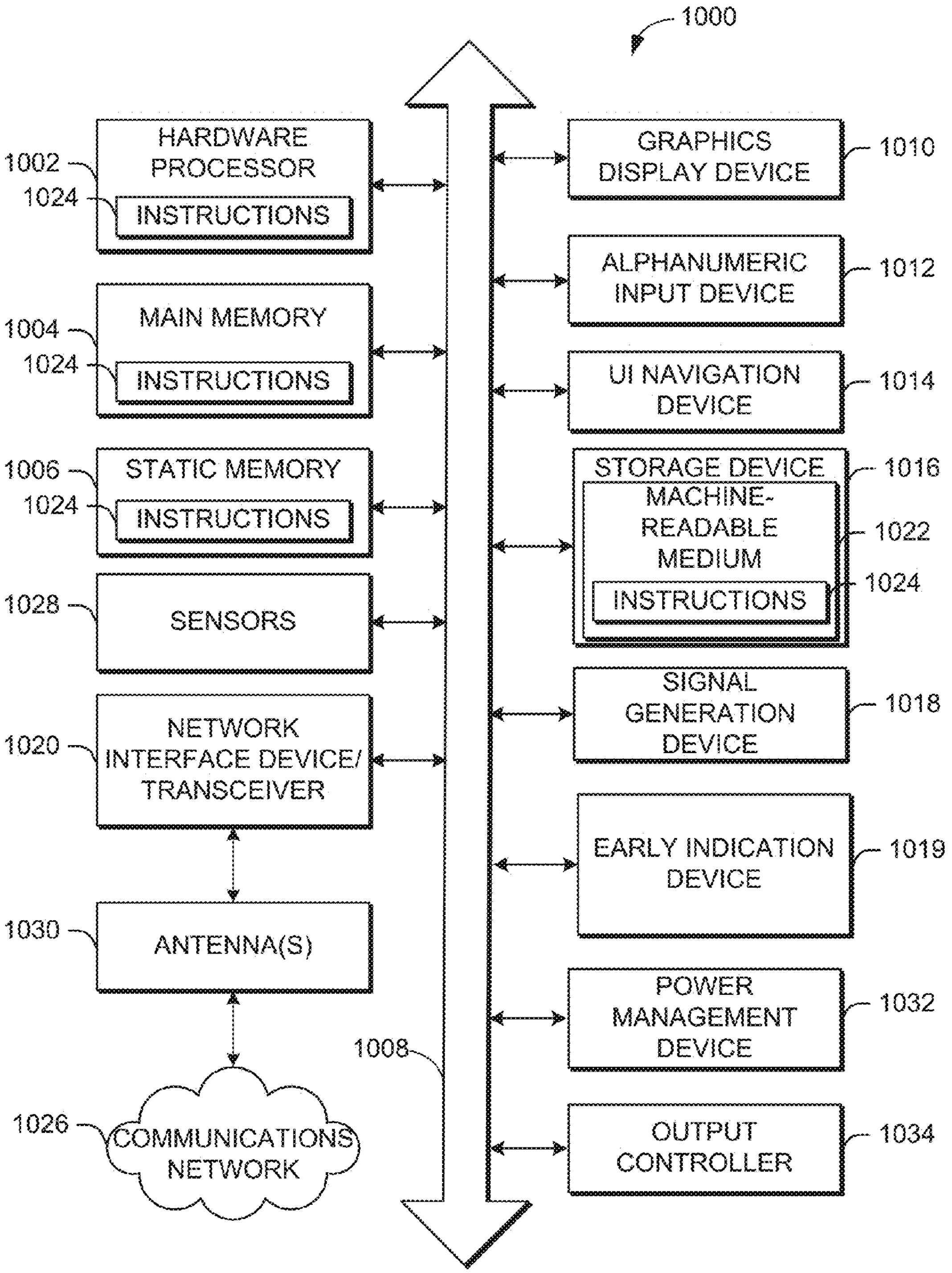
FIG. 10 is a block diagram of an example machine upon which any of one or more techniques (e.g., methods) may be performed, in accordance with one or more embodiments of the disclosure.

In some embodiments, the user devices 120 and AP 102 can include one or more computer systems similar to that of the functional diagram of FIG. 9 and/or the example machine/system of FIG. 10.

One or more illustrative user device(s) 120 may be operable by one or more user(s) 110. The user device(s) 120 (e.g., 124, 126, or 128) may include any suitable processordriven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user devices 120 (e.g., user devices 124, 126, and/or 128), the AP may communicate in the downlink direction by sending data frames. The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

Data frames may be modulated using modulation techniques to be transmitted from one computing device to another. The modulated data in accordance with one or more IEEE 802.11 standards may include one or more OFDM symbols. These OFDM symbols may be mapped onto a "constellation map" to represent the symbols in by their phase separation on the constellation map. Example of a modulation scheme may be the binary phase-shift keying (BPSK) or a quadrature binary phase-shift keying (QBPSK).

In one embodiment, and with reference to FIG. 1, an HEW preamble (e.g., preamble 140) may include at least one of legacy fields or high efficiency fields. The HEW preamble, for example, may include a legacy signal field (L-SIG), a repeated L-SIG (R-L-SIG), a high efficiency signal field A (HE-SIG-A), high efficiency signal field B (HE-SIG-B), high efficiency short training field (HE-STF), high efficiency long training field (HE-LTF) or other fields. It is understood that the above acronyms may be different and not to be construed as a limitation as other acronyms maybe used for the fields included in an HEW preamble.

During communications between AP 102 and one or more user devices 120 and before receiving the high efficiency SIGNAL A (HE-SIG-A) field, a device (e.g., AP 102 and/or user devices 120) may have already received other fields. These fields may be the L-SIG and the repeated L-SIG fields, as shown in preamble 140.

In one embodiment, the received L-SIG field may be utilized to encode a bit carried by the length field in the L-SIG field. For example, the length field value may be utilized to carry a bit that may enhance the decoding and/or determine the presence of high efficiency fields. This may enhance the reliability of the received high efficiency fields.

In addition to the above, other indications may be utilized to determine whether an HE-SIG-A and/or HE-SIG-B are repeated and/or are included in preamble 140. For example, knowing the location of one of the training fields (e.g., HE-STF or HE-LTF) may provide an indication of the status of the HE-SIG-A and/or the HE-SIG-B fields. Further, determining the type of constellation map used (e.g., BPSK or QBPSK) for representing one or more fields may also support the determination of whether the HE-SIG-A and/or HE-SIG-B are repeated and/or are included in preamble 140.

FIGS. 2(*a*)-(*d*) depict illustrative schematic diagrams of an HEW preamble composition, in accordance with one or more example embodiments of the present disclosure.

When a transmitting device (e.g., an AP or a user device) generates an HEW preamble to be transmitted to a receiving device (e.g., an AP or a user device), the transmitting device may determine the presence or absence of the HE-SIG-B and may relay that information during transmission so that the receiving device may determine the structure of the received HEW preamble. This may be accomplished, at least in part, by utilizing a QBPSK constellation in the second symbol of HE-SIG-A. Also, if the transmitting device determines that an HE-SIG-A field will be repeated, the transmitting device may relay that information to the receiving device, by utilizing the length field in L-SIG such that a division of the length field resulting in a reminder 1 or 2 may indicate a repetition or not. However, this scheme may be inefficient because it may take additional time (e.g., 1 μs) for constellation detection. Therefore, if the HE-SIG-B is absent, the user device receiving the fields may lose about 1 μs for automatic gain control (AGC) setting time in HE-STF because it took longer to determine whether HE-SIG-B is present or absent. The purpose of AGC is to regulate the received signal strength such that the required signal to noise ratio (SNR) for proper decoding is achieved.

In some embodiment, some information may need to be signaled before decoding the HE-SIG-A field. For example, some the information that may be signaled may be the presence of an HE-SIG-B field and the repetition of HE-SIG-A. FIGS. 2(*a*)-(*d*), show four combinations of an HEW preamble format depending on whether the HE-SIG-B is present and HE-SIG-A is repeated. FIG. 2(*a*) shows an HEW preamble with an HE-SIG-B field (e.g., field 202), and HE-SIG-A field (e.g., field 204) but without a repetition of the HE-SIG-A field 204. FIG. 2(*b*) shows an HEW preamble without an HE-SIG-B field, with an HE-SIG-A field (e.g., field 206) but without a repetition of the HE-SIG-A field. FIG. 2(*c*) shows an HEW preamble with an HE-SIG-B field 210 and with a repetition of an HE-SIG-A field (e.g., field 208). FIG. 2(*d*) shows an HEW preamble without an HE-SIG-B field but with a repetition (e.g., field 212) of an HE-SIG-A field 214. In cases where HE-SIG-B is not present, AGC may need to be reset after HE-SIG-A. If HE-SIG-A is repeated, two copies of HE-SIG-A may need to be combined for enhancing reliability. Therefore, in accordance with the embodiments of this disclosure, the various combinations may be indicated to a device that may receive these fields, such that the device may be able to properly decode these fields. The bit may be carried by dividing the length field by an integer value, such as 3. The remainder value may constitute the bit. Consequently, the bit may be utilized to indicate certain information based on how the bit is set. For example, if the bit is set to 0, this may indicate a remainder value of 1, and if the bit is set to 1, this may indicate the remainder value of 2.

In one embodiment, when a transmitting device (e.g., an AP or a user device) transmits data, the transmitting device may utilize the length field in L-SIG to indicate whether a training field, such as the HE-STF, is present at an earliest position. This position may be a location in time or in frequency. The earliest position may be a position that no earlier position for the HE-STF exists. If the HE-STF is not present at the earliest position (e.g., transmitted at a later time or frequency) a device receiving the data may determine whether HE-SIG-A is repeated and whether HE-SIG-B is present or not. The transmitting device may use QBPSK constellation to signal the HE-SIG-A repetition or the absence of HE-SIG-B. For example, using a predetermined constellation map (e.g., QBPSK or BPSK, or the like), a transmitting device may signal this information associated with HE-SIG-A and HE-SIG-B to the receiving device.

Figures 3A, 3B, 3C, 3D:
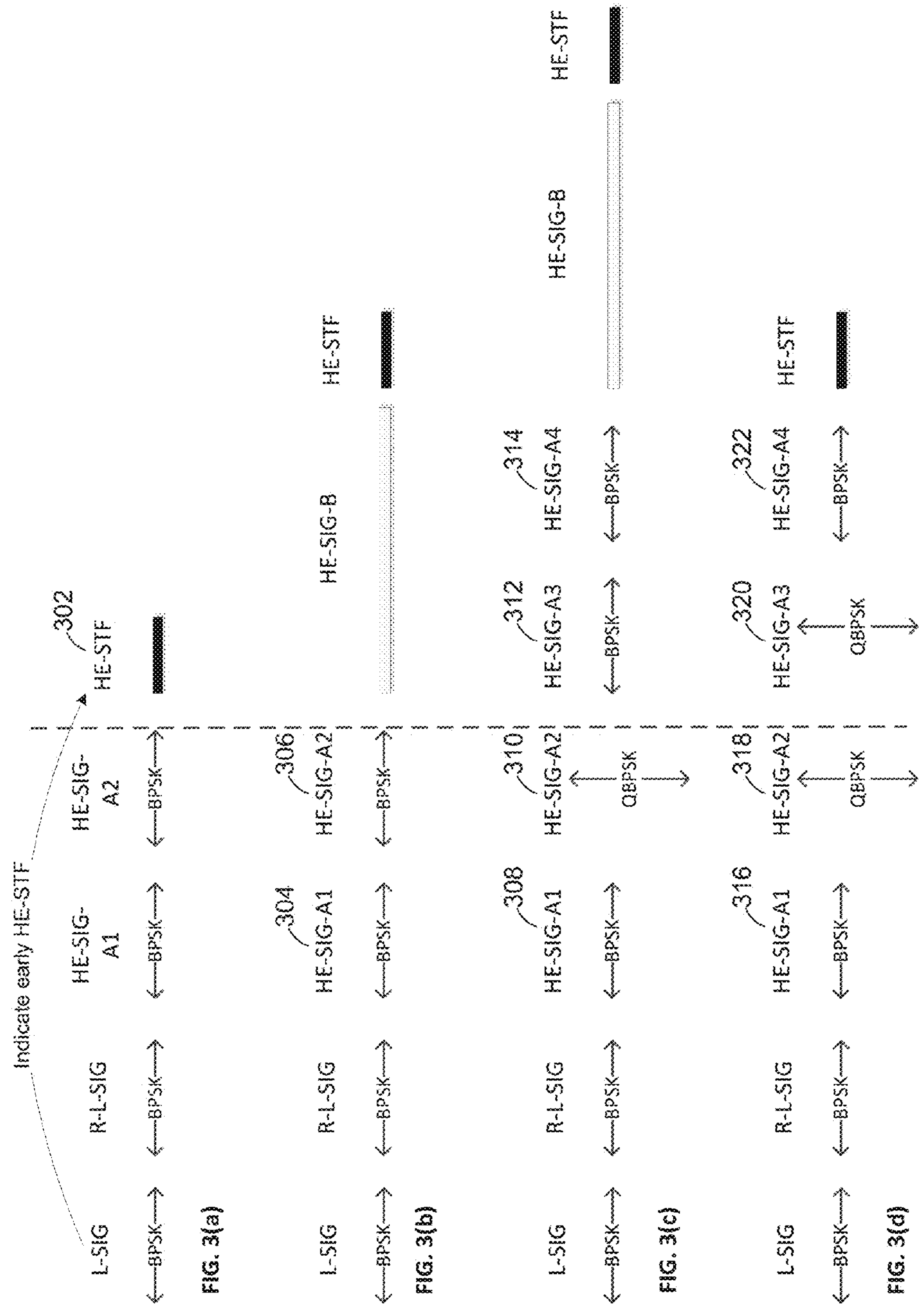
FIGS. 3(*a*)-(*d*) depict illustrative schematic diagrams showing orientations of one or more preamble symbols, in accordance with one or more example embodiments of the present disclosure.

FIGS. 3(*a*)-(*d*) depict illustrative schematic diagrams showing orientations of one or more preamble symbols, in accordance with one or more example embodiments of the present disclosure.

In one embodiment, a transmitting device (e.g., an AP or a user device) may determine the L-SIG field included in an HEW preamble that may be transmitted to another device (e.g., an AP or a user device). The L-SIG field may be comprised of one or more fields, for example, a length field. The transmitting device may determine the value of the length field included in the L-SIG and may divide that value by 3. The division may return is a 1 or a 2 remainder value. In other words, if the length field value is not a multiple of three, a remainder value of 1 or 2 may be returned. Therefore, this may result in an available bit (e.g., either a bit value of 0 or 1) in the length field of L-SIG that may indicate some predetermined information. For example, when the remainder value is 1, the indication bit may be set to 0, meaning that a certain outcome may occur. When the remainder value is 2, the indication bit may be set to 1, meaning that another outcome may occur.

Referring to FIG. 3(*a*), the remainder value may determine the location, for example, of an HE-STF symbol 302. For example, the transmitting device may use this indication bit to indicate whether the HE-STF 302 will be located as a 5th symbol, which is in this example the earliest position of the HE-STF. If the bit indicates that the HE-STF field exists at the earliest position, then the predetermined information may indicate that no HE-SIG-B and no HE-SIG-A repetition exist. In that case, the AGC may need to be reset at the 5th symbol. If the length bit indicates that the HE-STF field is not present at the earliest position, then either the HE-SIG-A is repeated or the HE-SIG-B is present.

FIGS. 3(*b*), (*c*), and (*d*) show three possible scenarios where the HE-STF 302 was not found at the earliest position.

Referring to FIG. 3(*b*), there is shown no repetition of the HE-SIG-A symbol that is designated with HE-SIG-A1 304 and HE-SIG-A2 306. In this example, the HE-SIG-A symbol is not repeated, based at least in part on the constellation used of the HE-SIG-A2 306 symbol. The HE-SIG-A2 306 symbol uses BPSK as the constellation, which may indicate that there is no repetition of the HE-SIG-A symbol. It is understood that other constellation types may be used to indicate whether there is a repetition or not of the HE-SIG-A symbol.

Referring to FIGS. 3(*c*) and (*d*), there is shown HE-SIG-A that is designated as HE-SIG-A1 308 and HE-SIG-A2 310 in FIG. 3(*c*) and as HE-SIG-A1 316 and HE-SIG-A2 318 in FIG. 3(*d*). A repetition of the HE-SIG-A symbol is determined by the QBPSK constellation used by the second symbol within HE-SIG-A (e.g., HE-SIG-A2 310 and 318). In that case, additional HE-SIG-A symbols, for example, HE-SIG-A3 312 and 320 of FIG. 3(*c*) and FIG. 3(*d*), respectively, and HE-SIG-A4 314 and 322 of FIG. 3(*c*) and FIG. 3(*d*), respectively. For example, looking at FIG. 3(*c*), the second symbol of the HE-SIG-A (e.g., HE-SIG-A2 310) is using QBPSK, thus, when a receiving device receives that symbol and determines that the constellation type used is QBPSK, the receiving device may determine that the HE-SIG-A is repeated. Therefore, the two symbols HE-SIG-A3 308 and HE-SIG-A4 310 are present. It should appreciated that the reverse may be true, that is if HE-SIG-A is not using QBPSK (e.g., using BPSK), it may be determined that a repeated HE-SIG-A is present.

In another embodiment, in order to indicate the absence or presence of HE-SIG-B, as shown in FIGS. 3 (*c*) and (*d*), the third symbol of HE-SIG-A (e.g., HE-SIG-A3) may use BPSK or QBPSK. For example, in FIG. 3 (*c*), if HE-SIG-A3 is determined to be using BPSK, then it may be determined that a HE-SIG-B field may exist. In contrast, if the third symbol of HE-SIG-A (e.g., HE-SIG-A3) uses QBPSK, maybe determined that HE-SIG-B is absent, as shown in FIG. 3(*d*). It is understood that these are some examples of representing whether the HE-SIG-B is present or not and whether HE-SIG-A is repeated or not. It should be appreciated that the reverse may be true, such that, if HE-SIG-A3 is using QBPSK, then HE-SIG-B exists, and if HE-SIG-A3 is using BPSK, and then HE-SIG-B does not exist. These combinations may be determined by the system, the network, administrator, the user, or any other entity that may be able to set the one or more length value and/or selecting the constellation type, in order to determine the presence or absence of HE-SIG-B, or the repetition of HE-SIG-A.

Figure 4A:
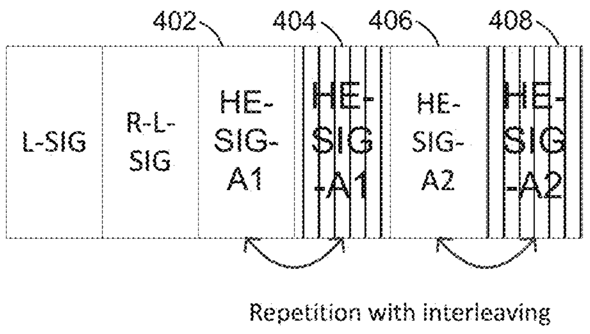
FIGS. 4(*a*)-(*b*) depict illustrative schematic diagrams of repetitions of a high efficiency signal symbol, in accordance with one or more example embodiments of the present disclosure.
Figure 4B:
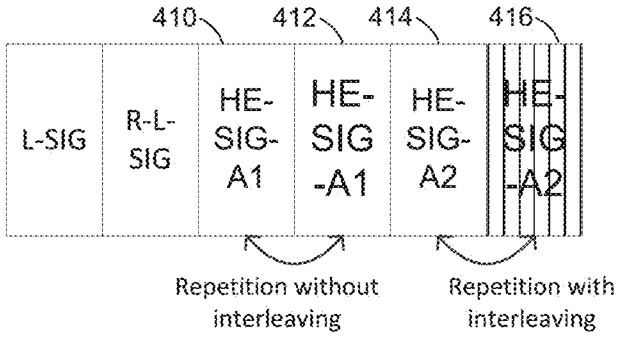

FIGS. 4(*a*)-(*b*) depict an illustrative schematic diagrams of repetitions of a high efficiency signal symbol (e.g., HE-SIG-A), in accordance with one or more example embodiments of the present disclosure.

The HE-SIG-A symbol may be repeated in different ways. In one option, the repetition may be a simple time domain repetition. This may not provide frequency diversity. In another option as shown in FIG. 4(*a*), both HE-SIG-A symbols may be interleaved and repeated. For example, the first HE-SIG-A symbol, HE-SIG-A1 402 may be interleaved and repeated as HE-SIG-A1 404, and HE-SIG-A2 406 may be interleaved and repeated as HE-SIG-A2 408. Interleaving may be utilized to provide time and/or frequency diversity and to increase robustness in the presence of changing channel characteristics. Interleaving is a technique for reordering data that is to be transmitted so that consecutive bytes of data are distributed over a larger sequence of data to reduce the effect of, for example, burst errors. However, in the case of interleaving both HE-SIG-A symbols, tone mappings of the codebits or coded QAM symbols may be different in the original and the repeated transmissions. This may make it difficult to detect the repetition by checking the original and repeated copies. In one embodiment, constellation detection may be more reliable. If the use of QBPSK constellation is not desired, one of the HE-SIG-A symbols may be repeated without interleaving as shown in FIG. 4(*b*). In FIG. 4(*b*), both HE-SIG-A symbols are repeated but only one is interleaved. That is, HE-SIG-A1 410 is repeated without interleaving as HE-SIG-A1 412, but HE-SIG-A2 412 is repeated with interleaving as HE-SIG-A2 416. The receiving device may detect the repetition of entire HE-SIG-A by checking the two copies of the same HE-SIG-A symbol (e.g., HE-SIG-A1 and repeated HE-SIG-A1). Furthermore, the polarity modulation in the repeated HE-SIG-A symbol may be used, to indicate more information such as the presence or absence of HE-SIG-B. For example, the phases of all data QAM symbols of the repeated HE-SIG-A symbol in the 4th symbol of FIG. 4(*b*) may be flipped by BPSK modulation. The repetition and polarity may be more reliable than QBPSK. However, the simple repetition without interleaving in FIG. 4(*b*) may lose some frequency diversity gain in one of the HE-SIG-A symbols. Since the HE-SIG-A repetition may be detected, the length bit in L-SIG may be used to signal the absence or presence of HE-SIG-B.

Figures 5A, 5B, 5C, 5D:
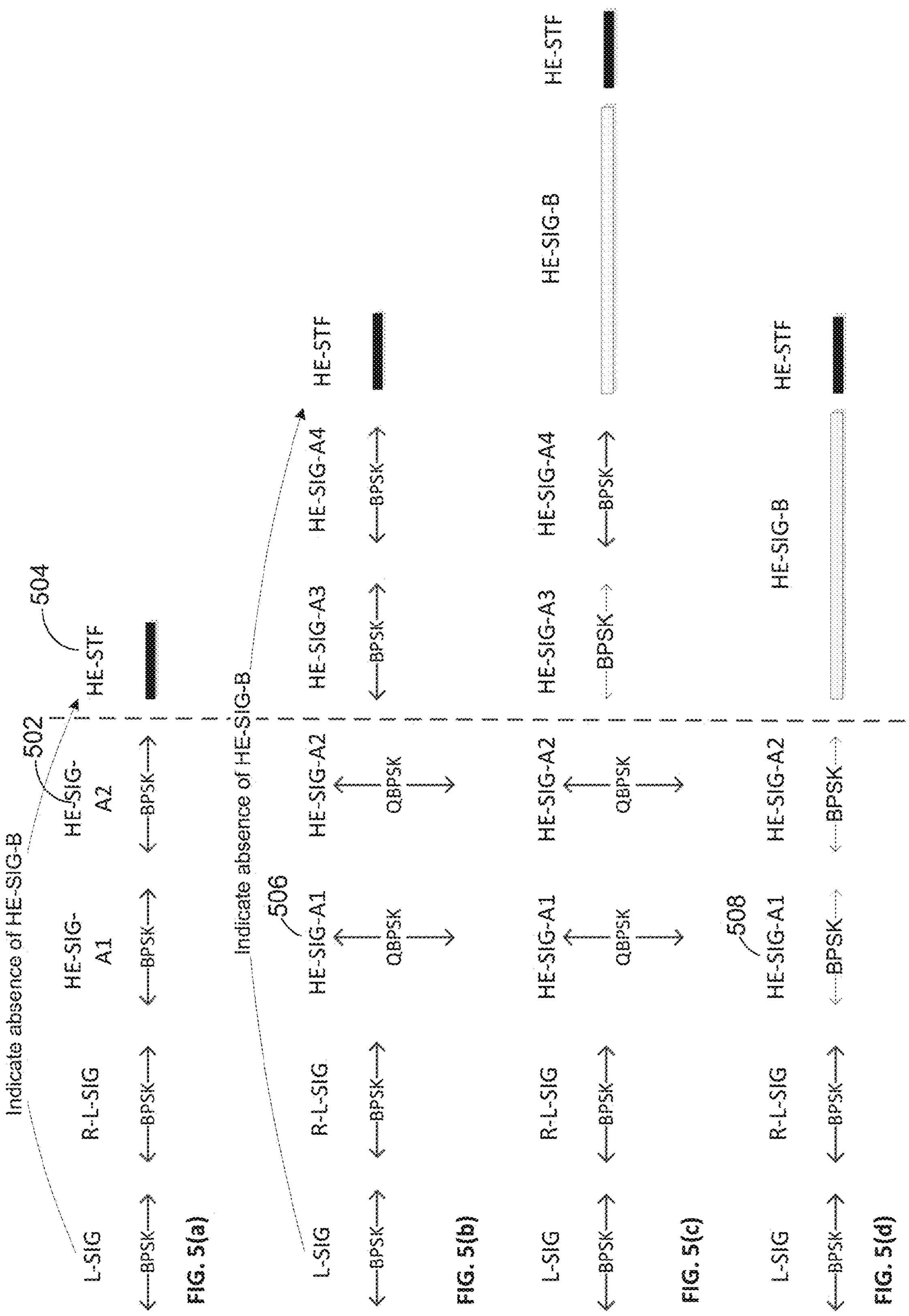
FIGS. 5(*a*)-(*d*) depict illustrative schematic diagrams showing constellation types used by one or more preamble symbols, in accordance with one or more example embodiments of the present disclosure.

FIGS. 5(*a*)-(*d*) depict illustrative schematic diagrams showing constellation types used by one or more preamble symbols, in accordance with one or more example embodiments of the present disclosure.

In one embodiment, a combination of using the length bit and the type and/or type of constellation may be used to determine whether an HE-SIG-A is repeated and/or whether an HE-SIG-B is present or not. The type of constellation may be viewed as a bit, such that the bit is set to 0 to indicate that the constellation used is QBPSK and when the bit is set to 1 to indicate that the constellation use is BPSK or vice versa. The length bit in L-SIG and the constellation bit may signal independent/different information. For example, the length bit may signal to the receiving device whether HE-SIG-B is present or not, and the constellation bit may signal to the receiving device the repetition or non-repetition of HE-SIG-A, or vice versa. The length may indicate the location of the HE-STF and based on that location, the presence or absence of the HE-SIG-B, may be determined. For example, as shown in FIG. 5(*a*), HE-STF 504 may be located after the second symbol of the HE-SIG-A, that is, HE-SIG-A2 502 (e.g., at the fifth symbol) may indicate that no repetition of HE-SIG-A, and HE-SIG-B is absent. Similarly, as shown in FIGS. 5(*b*), (*c*), and (*d*), the location of the HE-STF in combination of whether HE-SIG-A is repeated may determine whether HE-SIG-B is present or absent.

The constellation bit may indicate whether QBPSK or BPSK is used. In some instances, QBPSK (or BPSK) may be used in the first HE-SIG-A symbol (e.g., HE-SIG-A1) to signal the repetition of HE-SIG-A or lack of. Since the QBPSK constellation in the 3rd symbol of FIG. 5 (e.g., HE-SIG-A1) may make the preamble look like an IEEE 802.11ac preamble, the receiving device may need to rely on the length field in L-SIG in order to determine whether the length field value is a multiple of 3 or not (e.g., resulting in a remainder or not). If length field of the L-SIG is not a multiple of 3, the preamble may be determined to be for IEEE 802.11ax (e.g., HEW). Otherwise, for the preamble may be determined to be an IEEE 802.11ac preamble.

In one embodiment, in order to enhance the reliability of QBPSK constellation detection, the constellation of the second symbol HE-SIG-A symbol (e.g., HE-SIG-A2) may also change according to that of the first symbol (e.g., HE-SIG-A1). That is, if the HE-SIG-A1 is using QBPSK, the HE-SIG-A2 should also do the same. In this case, a device receiving the preamble may use two symbols to detect QBPSK or BPSK constellation. That is, the device receiving the preamble may determine the type of constellation used by both HE-SIG-A1 and HE-SIG-A2. It should be noted that the constellations of the two or four HE-SIG-A symbols may be selected from BPSK and QBPSK constellations. For example, the constellations of the first two symbols (e.g., HE-SIG-A1 and HE-SIG-A2) may be any combination of constellation. For example, (BPSK, BPSK) or (QBPSK, QBPSK) or (QBPSK, BPSK) or (BPSK, QBPSK).

As shown in FIG. 5(*b*) since HE-SIG-A1 506 uses QBPSK, this may indicate that the HE-SIG-A is repeated. In addition, determining that the HE-STF is at a location after the repeated HE-SIG-A (e.g., HE-SIG-A3 and HE-SIG-A4), may indicate that the HE-SIG-B is not present. In contrast, as shown in FIG. 5(*d*), since the HE-SIG-A1 508 is using BPSK, and the HE-STF is not at a location after the HE-SIG-A (e.g., at the fifth symbol), it may be determined that the HE-SIG-B is present.

It is understood that the above are only examples of length values and constellation, and that other length values and constellation types may be used in order to enhance the reliability of constellation detection and to determine the repetition of HE-SIG-A and/or the existence of HE-SIG-B in an HEW preamble. Also, the examples above may be true in a reverse order where the constellation type of the HE-SIG-A1 may determine the presence or absence of HE-SIG-B and/or the length field may be used, to determine HE-SIG-A is repeated or not.

Figures 6A, 6B, 6C, 6D:
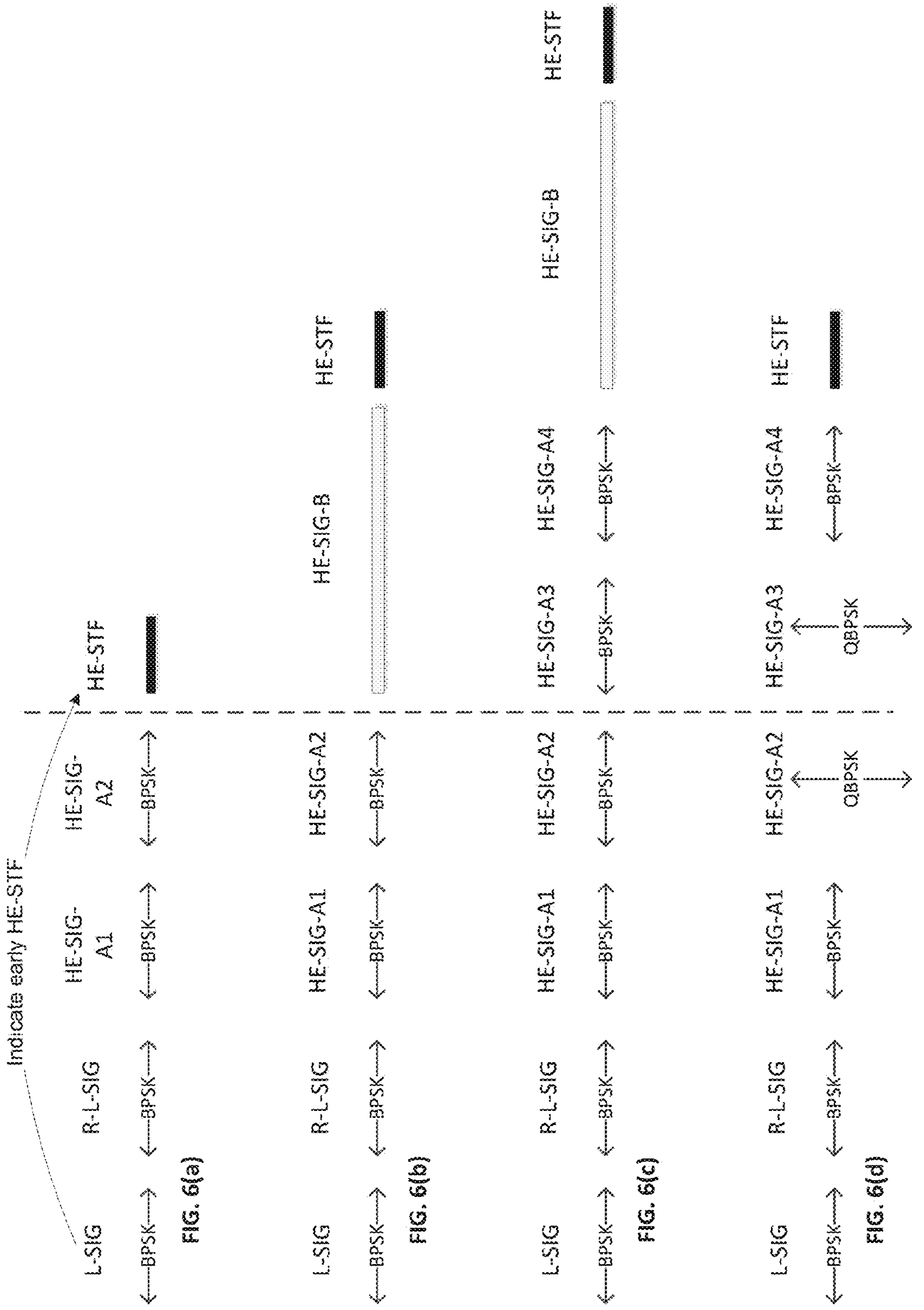
FIGS. 6(*a*)-(*d*) depict illustrative schematic diagrams showing constellation types used by one or more preamble symbols, in accordance with one or more example embodiments of the present disclosure.
Figures 6E, 6F, 6G, 6H:
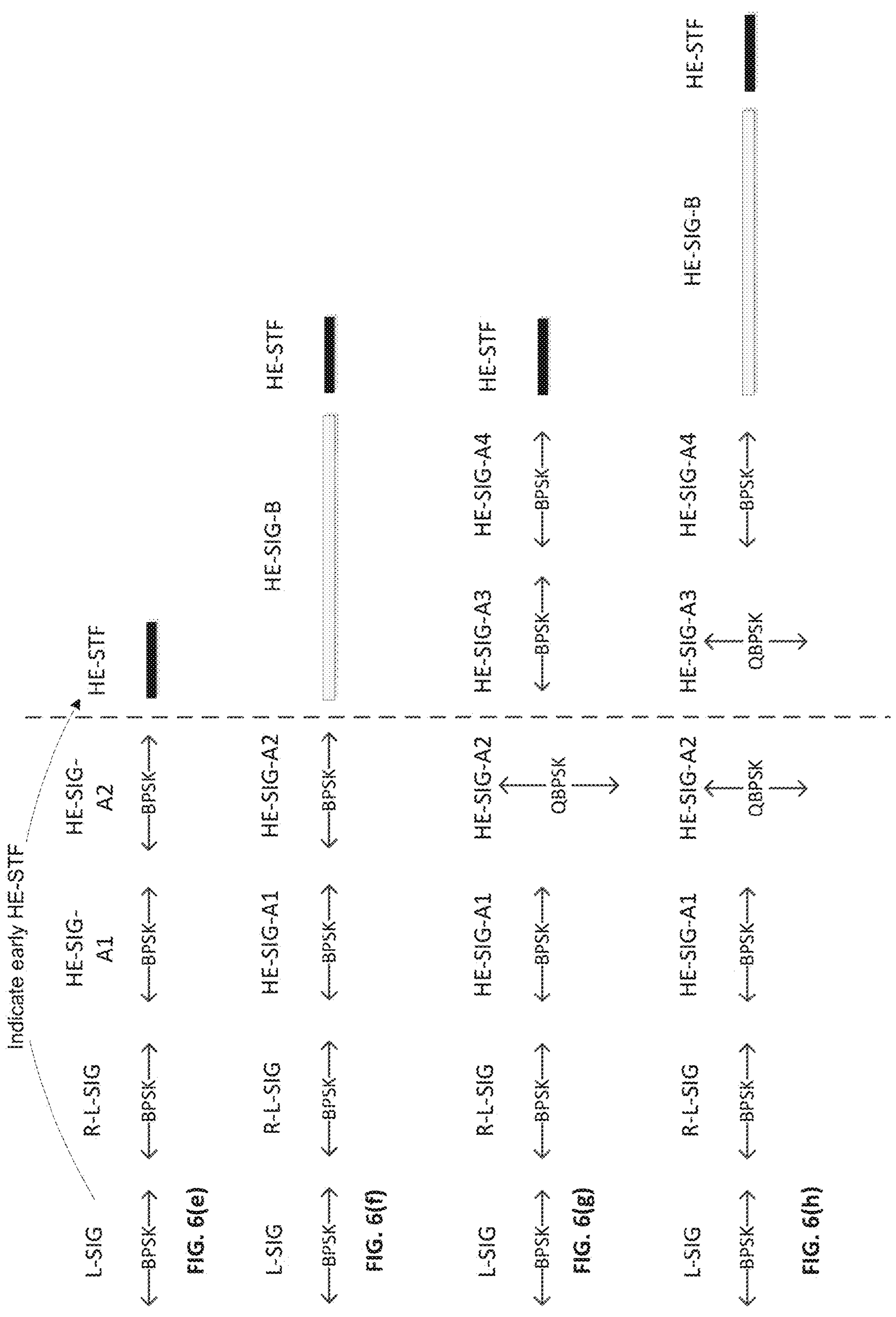

FIGS. 6(*a*)-(*d*) depict illustrative schematic diagrams showing constellation types used by one or more preamble symbols, in accordance with one or more example embodiments of the present disclosure.

In one embodiment, cyclic redundancy check (CRC) in the decoded bits of HE-SIG-A may be used. It is understood that CRC is an error-detecting code used in digital networks and storage devices to detect accidental changes to raw data. Blocks of data entering these systems get a short check value attached, based on the remainder of a polynomial division of their contents.

As explained above, there may be a bit available based at least in part on using the length field of L-SIG, for example, using a length field value that is not a multiple of 3. The bit is signaled by remainders 1 or 2 when the length field is divided by 3. This bit may indicate whether the HE-STF appears to location after the HE-SIG-A symbol (e.g., HE-SIG-A1 and HE-SIG-A2), for example, at the fifth symbol, where the earliest position of HE-STF may be indicated. If the bit indicates the earliest presence of HE-STF, then there is no HE-SIG-B and no HE-SIG-A repetition. The AGC may need to be reset at the fifth symbol. It is understood that the location of the HE-STF being at the fifth symbol should not be construed as a limitation and other location may be used as the earliest location of the HE-STF.

If the length bit indicates HE-STF is not present at the earliest position, then HE-SIG-A may be repeated or HE-SIG-B may be present. As shown in FIGS. 6(*b*), (*c*), (*d*). For indicating the presence or absence of HE-SIG-B in FIG. 6(*d*), the constellation of the second symbol of HE-SIG-A may be used (e.g., the 4th symbol). For example, orientation may be switched from BPSK to QBPSK or vice versa. The presence or absence of HE-SIG-B is indicated by the constellation type of the second HE-SIG-A symbol.

This may be done by decoding HE-SIG-A payload because the HE-SIG-A payload may specify which case is used by the decoding preamble. For example, the HE-SIG-A may be repeated in a two-symbol by two-symbol fashion. Namely, the entire HE-SIG-A content may be sent by the first two HE-SIG-A symbols for the first time and the content may be repeated in the third and fourth symbols later. The receiving device may first check the length bit in L-SIG and the constellation of the second HE-SIG-A symbol. The receiving device may know the preamble is either one of the cases show in FIGS. 6(*b*) or (*c*). The receiving device may then decode the first two HE-SIG-A symbols. If it succeeds, the receiving device may know which of FIGS. 6(*b*) and/or (*c*) the preamble is. If it fails, it may combine the next two symbols with the first two HE-SIG-A symbols and may decode the combined two symbols again. If the combining of the repeated HE-SIG-A signals provides enough signal energy, the decoding may pass and the receiver may know the preamble is sent using the case of FIG. 6(*c*). Even if the HE-SIG-A repetition is one-symbol by one-symbol, the scheme described above may still work. However, the decoding of the first two symbols that are two copies of the first HE-SIG-A symbols may have a probability passing the CRC.

FIGS. 6(*e*)-(*h*) depict illustrative schematic diagrams showing constellation types used by one or more preamble symbols, in accordance with one or more example embodiments of the present disclosure. The high-efficiency short training field (HE-STF) may need to be known by the receiving device ahead of time so that the automatic gain control (AGC) may be unlocked for resetting.

The length field in L-SIG and the repeated L-SIG (R-L-SIG) may be set to have a remainder of 1 or 2 when divided by 3. For example, remainder 1 may indicate the symbols in FIG. 6(*e*), and remainder 2 may indicate the symbols in FIGS. 6(*f*), (*g*), and (*h*). As explained above, there may be a bit available based at least in part on using the length field of L-SIG, for example, using a length field value that is not a multiple of 3. The bit is signaled by remainders 1 or 2 when the length field is divided by 3. This bit may indicate whether the HE-STF appears at the right after the HE-SIG-A2 (e.g., 5th symbol in this example), where the earliest position of HE-STF is indicated. If the bit indicates the earliest presence of HE-STF, then there is no HE-SIG-B and no HE-SIG-A repetition. The AGC may need to be reset at the 5th symbol.

If the length bit indicates HE-STF is not present at the earliest position, then HE-SIG-A may be repeated or HE-SIG-B may be present or vice versa.

In one embodiment, the constellation type of the second HE-SIG-A symbol (e.g., HE-SIG-A2 in FIG. 2) may be used to indicate the repetition of HE-SIG-A. The constellation may be BPSK or QBPSK. For example, in FIG. 6(*g*), having a constellation type of QBPSK may be used to indicate that HE-SIG-A is repeated. Consequently, having a constellation type of BPSK, for example, in FIG. 6(*f*) may indicate that HE-SIG-A is not repeated and at the same time, this may indicate that the HE-SIG-B is present. The receiving device may detect the BPSK constellation of HE-SIG-A2 and may start the decoding of HE-SIG-A. The number of HE-SIG-B symbols may be indicated in HE-SIG-A and/or the common part of HE-SIG-B. In contrast, if the receiving device detects QBPSK constellation on HE-SIG-A2, the receiving device may combine the additional symbols HE-SIG-A3 and HE-SIG-A4 for decoding HE-SIG-A.

In one embodiment, and to further distinguish between FIGS. 6(*g*) and (*h*), the symbols in the repeated HE-SIG-A may be used (e.g., HE-SIG-A3 and HE-SIG-A4). Since there are additional symbols because HE-SIG-A is repeated, the receiving device may have more time than FIGS. 6(*e*) and (*f*) for processing. The constellation of the third HE-SIG-A symbol denoted by HE-SIG-A3 may be used. The constellation may be QBPSK or BPSK. For example, BPSK may be used to indicate the absence of HE-SIG-B. In this case, QBPSK may indicate the presence of HE-SIG-B. It should be appreciated that the use of the constellation type may be reversed in order to indicate whether HE-SIG-B is present or not. For example, the constellation type BPSK of the third HE-SIG-A symbol HE-SIG-A3 may indicate that the HE-SIG-B is present in the preamble. Consequently, having a constellation type of QBPSK for the HE-SIG-A3 may indicate the absence of HE-SIG-B in the preamble. It is understood that the above are examples of various combinations of QBPSK and BPSK in order to denote the presence or absence of one or more of high-efficiency symbols, and that other combinations of constellation types may be used to indicate the presence or repetition of one or more high-efficiency symbols.

Figure 7:
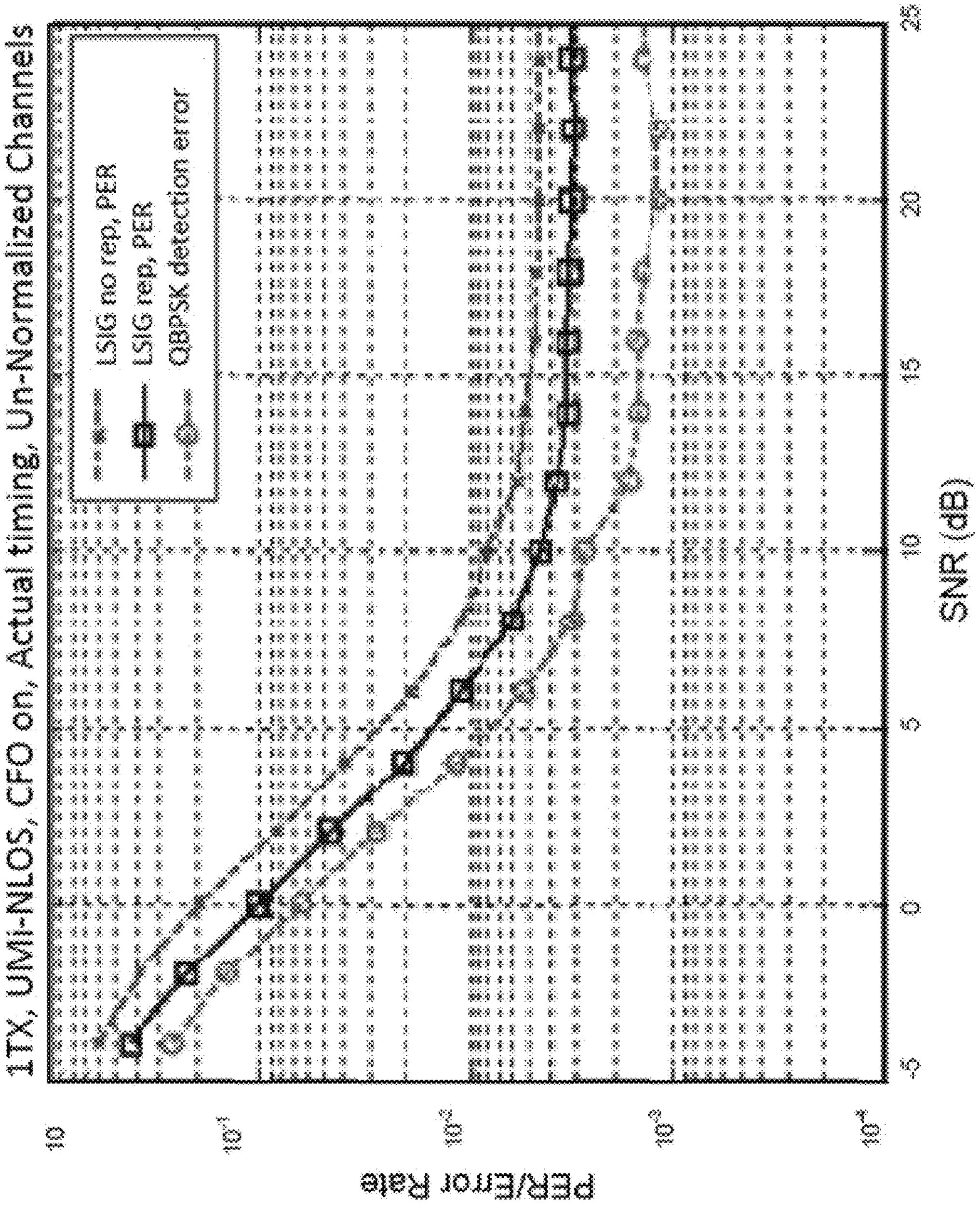
FIG. 7 depicts an illustrative schematic diagram showing a performance comparison for the QBPSK detection, in accordance with one or more example embodiments of the present disclosure.

FIG. 7 depicts an illustrative schematic diagram showing a performance comparison for the QBPSK detection, in accordance with one or more example embodiments of the present disclosure.

In one embodiment, for enhancing the reliability of QBPSK constellation detection, the constellation types of the third and/or fourth HE-SIG-A symbol may be also used or rotated as illustrated in FIGS. 6(*a*)-(*d*). The joint rotation of multiple symbols may boost the reliability of signaling. The performance of QBPSK detection is shown in FIG. 7.

Even using the rotation on a single symbol, the performance of QBPSK detection may be more reliable than the combined L-SIG/R-L-SIG.

Figure 8A:
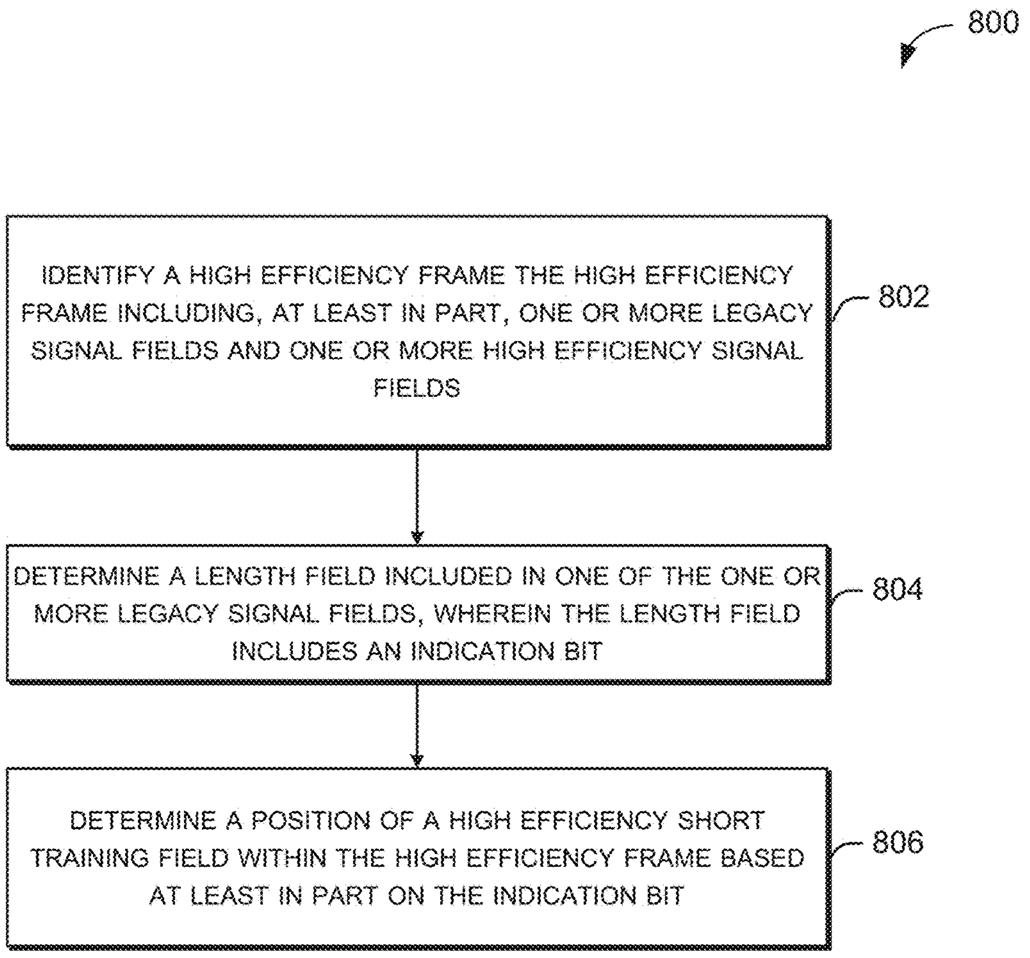
FIG. 8(*a*) depicts a flow diagram of an illustrative process for an illustrative early indication system, in accordance with one or more embodiments of the disclosure.
Figure 8B:
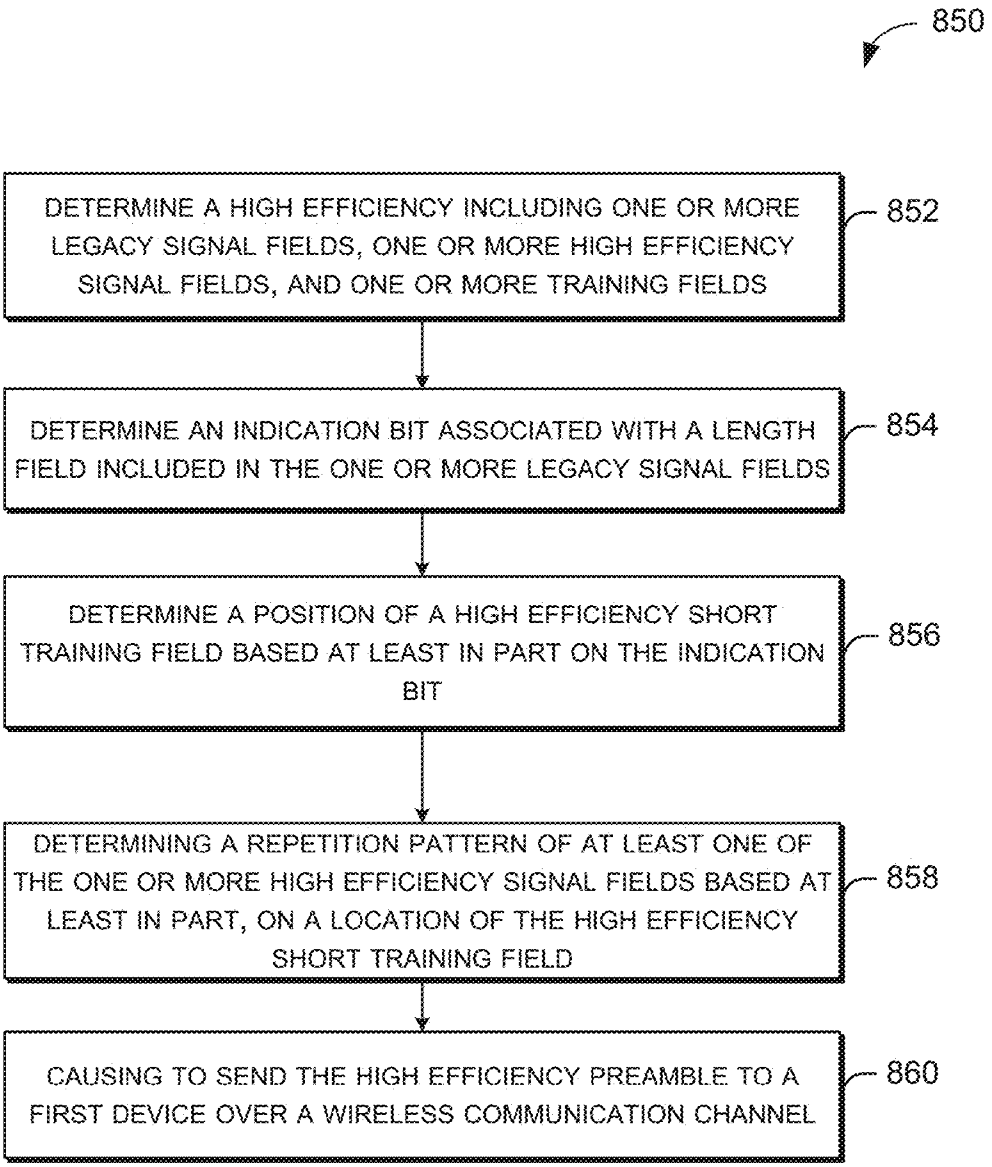

FIG. 8(*a*) illustrates a flow diagram of illustrative process 800 for an early indication system in accordance with one or more embodiments of the disclosure.

When one or more devices, such as an AP and/or user devices, communicate with other devices, the one or more devices may receive one or more high-efficiency preambles that contain at least in part one or more high-efficiency fields. When a user device receives such a high-efficiency preamble, the user device may decode the fields and/or symbols contained within the high-efficiency preamble in order to access the encoded information.

At block 802, a user device (e.g., user device 120 of FIG. 1) may identify a high efficiency frame in accordance with a high efficiency communication standard, received from a another device such as an AP or other user devices. The high efficiency frame may include one or more legacy signal fields (e.g., L-SIG and/or R-L-SIG) and one or more high efficiency signal fields. The one or more high efficiency signal fields include at least one of a high efficiency signal A (HE-SIG-A) field or a high efficiency signal B (HE-SIG-B) field. Other high-efficiency fields may be training fields such as high efficiency short training field (HE-STF) and/or high-efficiency loan training field (HE-LTF).

At block 804, the user device may determine a length field included in one of the one or more legacy signal fields, wherein the length field includes an indication bit. For example, the L-SIG may contain a length field, having a length value. In some embodiments, the length field may be divided by a predetermined number, for example 3, in order to determine a remainder value. The remainder value based on the division by, for example, 3, may determine various information. For example, a remainder value based on the division by 3 may determine position of HE-STF within the high-efficiency frame. For example having a remainder value equal to 1 may provide some indication associated with the HE-STF.

At block 806, the user device may determine a position of a high efficiency short training field within the high efficiency frame based at least in part on the indication bit. The indication bit may be two possibilities of a remainder value being, for example, 1 or 2. In that case, having the indication bit associated with the remainder values of 1 or 2 may provide an indication of the position of the HE-STF. For example, a remainder value of 1 may provide an indication that the HE-STF is at, for example, the earliest location possible for the HE-STF (e.g., at the 5th symbol location). This is assuming that L-SIG, R-L-SIG, and HE-SIG-A are present in the high-efficiency frame, without any other symbols before the HE-STF. In the case where the HE-STF is at the fifth symbol, this may indicate that the HE-SIG-B is not present. This is true because if the HE-SIG-B is present, it would be located before the HE-STF, which would indicate that the HE-STF may not be at the fifth symbol within the high-efficiency frame.

In some scenarios, the device may determine that the HE-SIG-A field is repeated in the high efficiency frame if the high efficiency short training field is not at the predetermined symbol position. For example, if the HE-STF is located beyond the fifth symbol in the high-efficiency frame, this may indicate that either the HE-SIG-B is present and/or the HE-SIG-A is repeated. The HE-SIG-A may contain a first high efficiency symbol (e.g., HE-SIG-A1) and a second high efficiency symbol (HE-SIG-A2). In case the HE-SIG-A is repeated, there may be additional HE-SIG-A symbols, for example, HE-SIG-A3 and HE-SIG-A4. The symbols may be oriented and/or may utilize one or more constellation types. The one or more constellation types may include a binary phase-shift key (BPSK) or a quadrature binary phase-shift key (QBPSK). In some scenarios, based on the constellation type, the device may determine that the HE-SIG-A field is repeated or not and/or whether the HE-SIG-B is present or not. In other scenarios, the orientation of the first or the second symbols of the HE-SIG-A (e.g., HE-SIG-A1 or HE-SIG-A2) may determine whether there is a repetition of the HE-SIG-A field, or whether the HE-SIG-B is present or not, or vice versa. For example, HE-SIG-A1 may utilize QBPSK for the constellation type, which may be determined to indicate that there is a repetition in the HE-SIG-A field. Further, the location of the HE-STF may determine whether the HE-SIG-B is present or not. Another example, if the HE-SIG-A1 uses a BPSK constellation type, it may be indicative that there is no repetition in the HE-SIG-A field, or it may indicate that the HE-SIG-B is present or not. It is understood that the above scenarios may be reversed, for example, the use of a specific constellation type may determine the presence or absence of the HE-SIG-B field, and the presence of the HE-STF at the fifth symbol or beyond may indicate whether the HE-SIG-A field is present or not.

FIG. 8(*b*) illustrates a flow diagram of illustrative process 850 for an early indication system in accordance with one or more embodiments of the disclosure.

When one or more devices, such as an AP and/or user devices, communicate with other devices, the one or more devices may send one or more high-efficiency preambles that contain at least in part one or more high-efficiency fields. The one or more devices may encode the fields and/or symbols contained within a high-efficiency preamble in order to provide data and/or relevant information to the receiving device.

At block 852, during communication between an AP and a user device, the AP may determine a high efficiency preamble in accordance with a high efficiency communication standard (e.g., HEW). The AP may use the high-efficiency preamble to communicate with the user device. The High efficiency preamble may include one or more legacy signal fields (e.g., L-SIG and/or R-L-SIG), one or more high efficiency signal fields (e.g., HE-SIG-A, and/or HE-SIG-B), and one or more training fields (e.g., HE-STF, and/or HE-LTF).

At block 854, the AP may determine an indication bit associated with a length field included in the one or more legacy signal fields. For example, the AP may determine, based on a remainder value of the length field by an integer value. For example, dividing the length field by integer value 3 may result in a remainder value of 1 or 2. These two remainder values may constitute an indication bit, where each value of the indication bit may indicate a certain outcome. For example, when the remainder value is 1, the indication bit may be set to 0, meaning that a certain outcome may occur. When the remainder value is 2, the indication bit may be set to 1, meaning that another outcome may occur.

At block 856, the AP may determine a position of the HE-STF based at least in part on the indication bit. For example, it may be determined that based on whether the indication bit is set to 0 or 1, the HE-STF field is present at a certain location or not. For example, having an indication bit of 1 may indicate that the HE-STF is located at the earliest symbol position, for example, at the fifth symbol location. In that case, it may be determined that other high-efficiency field are present or not, and/or that other high-efficiency fields may be repeated or not.

At block 858, the AP may determine a repetition pattern of at least one of the one or more high efficiency signal fields (e.g., HE-SIG-A, and/or HE-SIG-B), based at least in part, on the location of the HE-STF. For example, the AP may determine that the HE-SIG-A field is repeated in the high-efficiency frame if the HE-STF is not at the predetermined symbol decision that was indicated in the indication bit. For example, if the indication bit indicates that the HE-STF is at a location farther than the fifth symbol, it may be determined that the HE-SIG-A is repeated. In case the HE-SIG-A is repeated, there may be additional HE-SIG-A symbols, for example, HE-SIG-A3 and HE-SIG-A4. The symbols may be oriented and/or may utilize one or more constellation types. The one or more constellation types may include a binary phase-shift key (BPSK) or a quadrature binary phase-shift key (QBPSK). When encoding the various fields in the high-efficiency frame, the AP may determine which constellation type to use for a particular field. For example, the AP may determine that a first symbol of the HE-SIG-A may use BPSK or QBPSK. Using one constellation type, as opposed to another, may be used as an indication of whether a high efficiency symbol is repeated and/or a high efficiency symbol is present or not. In addition, depending on which symbol of the high-efficiency field has that type of constellation type may also determine whether a high efficiency field is repeated and/or a high efficiency field is present or not. For example, since HE-SIG-A field has symbols HE-SIG-A1 and HE-SIG-A2, the constellation type used by HE-SIG-A1 and/or the constellation type used by HE-SIG-A2, or combination of the two constellation types, may indicate whether a high efficiency field is repeated and/or a high efficiency field is present or not. The high-efficiency fields may be HE-SIG-A or HE-SIG-B.

At block 860, after the AP generates the high-efficiency preamble, the AP may send the high-efficiency preamble to one or more user devices (e.g., user devices 120 of FIG. 1). When the one or more user devices receive the high-efficiency preamble from the AP, the one or more user devices may decode the various fields within the high-efficiency preamble. The one or more user devices may rely on the indications, such as the indication bit associated with the length field, the orientation and/or the type of constellation used by one or more symbols within the high-efficiency fields to determine the location, repetition, and/or presence of one or more high-efficiency fields. As explained above, these high-efficiency fields may be HE-STF, HE-SIG-A, and/or HE-SIG-B. Although these three high-efficiency fields are utilized in the examples above, indications may be used for other high-efficiency fields within the high-efficiency preamble.

FIG. 9 shows a functional diagram of an exemplary communication station 900 in accordance with some embodiments. In one embodiment, FIG. 9 illustrates a functional block diagram of a communication station that may be suitable for use as an AP 102 (FIG. 1) or a user device 120 (FIG. 1) in accordance with some embodiments. The communication station 900 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 900 may include communications circuitry 902 and a transceiver 910 for transmitting and receiving signals to and from other communication stations using one or more antennas 901. The communications circuitry 902 may include circuitry that can operate the physical layer communications and/or medium access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in FIGS. 2-8.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device may, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device memory.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term “machine” shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), an early indication device 1019, a network interface device/transceiver 1020 coupled to antenna(s) 1030, and one or more sensors 1028, such as a global positioning system (GPS) sensor, compass, accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The early indication device 1019 may be carried out or performed by any of the operations and processes (e.g., processes 800 and 850) described and shown above. For example, the early indication device 1019 may be configured to use the length field in L-SIG to indicate whether a training field (e.g., HE-STF) is present at the earliest position (e.g., the 5th symbol in FIG. 3) or not. If the HE-STF is not present at the earliest position, a device receiving the preamble may determine whether HE-SIG-A is repeated or not and whether HE-SIG-B is present or not based on early bits, such as, an early bit determined from the L-SIG field and the type of constellation map is used (e.g., QBPSK or BPSK). The device transmitting the preamble may use, for example, QBPSK constellation to signal that there is an HE-SIG-A repetition and/or the absence of HE-SIG-B.

While the machine-readable medium 1022 is illustrated as a single medium, the term “machine-readable medium” may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium.

Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to identify a high efficiency frame in accordance with a high efficiency communication standard, received from a first device, the high efficiency frame including at least one or more legacy signal fields and one or more high efficiency signal fields. The at least one processor of the one or more processors may be configured to execute the computer-executable instructions to determine a length field included in one of the one or more legacy signal fields, wherein the length field may include an indication bit. The at least one processor of the one or more processors may be configured to execute the computer-executable instructions to determine a position of a high efficiency short training field within the high efficiency frame based at least in part on the indication bit.

The implementations may include one or more of the following features. The one or more high efficiency signal fields include at least one of a high efficiency signal A (HE-SIG-A) field or a high efficiency signal B (HE-SIG-B) field. The at least one processor of the one or more processors is further configured to execute the computer-executable instructions to identify a first high efficiency symbol of the HE-SIG-A field and a second high efficiency symbol of the HE-SIG-A field. The at least one processor of the one or more processors may be configured to execute the computer-executable instructions to identify a presence of the HE-SIG-B field. The at least one processor of the one or more processors may be configured to execute the computer-executable instructions to identify a constellation type used by the first high efficiency symbol. The at least one processor of the one or more processors may be configured to execute the computer-executable instructions to identify a repeated HE-SIG-A field based at least in part on the constellation type. The constellation type is one of a binary phase-shift key (BPSK) or a quadrature binary phase-shift key (QBPSK). the at least one processor of the one or more processors is further configured to execute the computer-executable instructions to determine there is a repeated HE-SIG-A field if the constellation is a QBPSK in the second high efficiency symbol of the HE-SIG-A field. The at least one processor of the one or more processors is further configured to execute the computer-executable instructions to determine a remainder of a division of the length field by a predetermined number. The position of the high efficiency short training field is at a predetermined symbol position when the remainder is equal to one or 2. The predetermined symbol position is at a location after a second high efficiency symbol of the HE-SIG-A field. the at least one processor is further configured to execute the computer-executable instructions to determine that the HE-SIG-A field is repeated in the high efficiency frame or the HE-SIG-B field is presented if the high efficiency short training field is not at the predetermined symbol position. The device of claim 1, further comprising a transceiver configured to transmit and receive wireless signals. The device of claim 10, further comprising an antenna coupled to the transceiver.

In example embodiments of the disclosure, there may be a non-transitory computer-readable medium. The on-transitory computer-readable medium may store computer-executable instructions which, when executed by a processor, cause the processor to perform operations comprising determining a high efficiency preamble in accordance with a high efficiency communication standard, the high efficiency preamble including, at least in part, one or more legacy signal fields, one or more high efficiency signal fields, and one or more training fields, determining an indication bit associated with a length field included in the one or more legacy signal fields, determining a position of a high efficiency short training field based at least in part on the indication bit, determining a repetition pattern of at least one of the one or more high efficiency signal fields based at least in part, on a location of the high efficiency short training field, and causing to send the high efficiency preamble to a first device over a wireless communication channel.

Implementations may include one or more of the following features. The one or more high efficiency signal fields include at least one of a high efficiency signal A (HE-SIG-A) field or a high efficiency signal B (HE-SIG-B) field. The computer-executable instructions cause the processor to further perform operations comprising determining a high efficiency signal A (HE-SIG-A) field of the one or more high signal fields, the HE-SIG-A field comprising a first high efficiency symbol and a second high efficiency symbol, determining a constellation type used by the first high efficiency symbol, and determining a repeated HE-SIG-A field based at least in part on the constellation type. The computer-executable instructions cause the processor to further perform operations comprising determining a remainder of a division of the length field by a predetermined number. The constellation type is one of a binary phase-shift key (BPSK) or a quadrature binary phase-shift key (QBPSK). The position of the high efficiency short training field is at a predetermined symbol position when the remainder is equal to 1 or 2. The predetermined symbol position is at a fifth symbol of one or more symbols of the high efficiency preamble. The computer-executable instructions cause the processor to further perform operations comprising determining that the HE-SIG-A field is repeated in the high efficiency preamble if the high efficiency short training field is not at the predetermined symbol position.

In example embodiments of the disclosure, there may be a method. The method may include identifying a high efficiency frame in accordance with a high efficiency communication standard, received from a first device, the high efficiency frame including at least one or more legacy signal fields and one or more high efficiency signal fields, determining a length field included in one of the one or more legacy signal fields, wherein the length field may include an indication bit, and determining a position of a high efficiency short training field within the high efficiency frame based at least in part on the indication bit.

Implementations may include one or more of the following features. The one or more high efficiency signal fields include at least one of a high efficiency signal A (HE-SIG-A) field or a high efficiency signal B (HE-SIG-B) field. the method may further may include identifying a first high efficiency symbol of the HE-SIG-A field and a second high efficiency symbol of the HE-SIG-A field, identifying a presence of the HE-SIG-B field, identifying a constellation type used by the first high efficiency symbol, and identifying a repeated HE-SIG-A field based at least in part on the constellation type. The constellation type is one of a binary phase-shift key (BPSK) or a quadrature binary phase-shift key (QBPSK). The method may further include determining there is a repeated HE-SIG-A field if the constellation is a QBPSK in the second high efficiency symbol of the HE-SIG-A field. The method may further include determining a remainder of a division of the length field by a predetermined number. The position of the high efficiency short training field is at a predetermined symbol position when the remainder is equal to one or 2. The predetermined symbol position is at a location after the second high efficiency symbol of the HE-SIG-A field. The method may further include determining that the HE-SIG-A field is repeated in the high efficiency frame or the HE-SIG-B field is presented if the high efficiency short training field is not at the predetermined symbol position.

In example embodiments of the disclosure, there may be an apparatus. The apparatus may include means for identifying a high efficiency frame in accordance with a high efficiency communication standard, received from a first device, the high efficiency frame including at least one or more legacy signal fields and one or more high efficiency signal fields. The apparatus may include means for determining a length field included in one of the one or more legacy signal fields, wherein the length field includes an indication bit. The apparatus may include means for determining a position of a high efficiency short training field within the high efficiency frame based at least in part on the indication bit.

Implementations may include one or more of the following features. The one or more high efficiency signal fields include at least one of a high efficiency signal A (HE-SIG-A) field or a high efficiency signal B (HE-SIG-B) field. The apparatus may further include means for identifying a first high efficiency symbol of the HE-SIG-A field and a second high efficiency symbol of the HE-SIG-A field means for identifying a presence of the HE-SIG-B field. The apparatus may include means for identifying a constellation type used by the first high efficiency symbol. The apparatus may include means for identifying a repeated HE-SIG-A field based at least in part on the constellation type. The constellation type is one of a binary phase-shift key (BPSK) or a quadrature binary phase-shift key (QBPSK). The apparatus may further include means for determining there is a repeated HE-SIG-A field if the constellation is a QBPSK in the second high efficiency symbol of the HE-SIG-A field. The apparatus may further include means for determining a remainder of a division of the length field by a predetermined number. The position of the high efficiency short training field is at a predetermined symbol position when the remainder is equal to 1 or 2. The predetermined symbol position is at a location after the second high efficiency symbol of the HE-SIG-A field. The apparatus may further include means for determining that the HE-SIG-A field is repeated in the high efficiency frame or the HE-SIG-B field is presented if the high efficiency short training field is not at the predetermined symbol position.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless device including medium access control (MAC) circuitry and physical layer (PHY) circuitry coupled to the MAC circuitry, the MAC circuitry and PHY circuitry having logic to:

generate a high efficiency data frame having a preamble, the preamble including a legacy signal field (L-SIG), a repeated L-SIG field (R-L-SIG), a high efficiency signal field A (HE-SIG-A), a high efficiency short training field (HE-STF), and a high efficiency long training field (HE-LTF), R-L-SIG being a repetition of L-SIG in a time domain, HE-SIG-A to include a first high efficiency signal A symbol (HE-SIG-A1) and a second high efficiency signal A symbol (HE-SIG-A2);

determine a value of a length field of the L-SIG such that the value of the length field divided by 3 has a remainder value of 1 or 2, wherein the remainder value being equal to a first remainder value of 1 or 2 is to indicate that HE-SIG-A is not repeated in the preamble in the time domain and that a high efficiency signal field B (HE-SIG-B) is not present in the preamble, and the remainder value being equal to a second remainder value of 1 or 2 otherwise, the first remainder value being different from the second remainder value; and cause transmission of the data frame;

wherein, to indicate that HE-SIG-A is not repeated, the logic to map HE-SIG-A1 and HE-SIG-A2 onto a binary phase shift keying (BPSK) constellation.

2. The device of claim 1, wherein:

HE-SIG-A further includes a third high efficiency signal A symbol (HE-SIG-A3) and a fourth high efficiency signal A symbol (HE-SIG-A4); and to indicate that HE-SIG-A is repeated, the logic is to map HE-SIG-Al onto a binary phase shift keying (BPSK) constellation and HE-SIG-A2 onto a quadrature binary phase shift keying (QBPSK) constellation, wherein the QBPSK constellation is different from the BPSK constellation.

3. The device of claim 1, wherein, when the remainder value is equal to the second remainder value:

to indicate that HE-SIG-A is not repeated and that HE-SIG-B is present in the preamble, the logic is to map HE-SIG-A2 to a binary phase shift keying (BPSK) constellation, and to indicate that HE-SIG-A is repeated, the logic is to map HE-SIG-A2 to a quadrature binary phase shift keying (QBPSK) constellation the QBPSK constellation being different from the BPSK constellation.

4. The device of claim 3, wherein the logic is to map HE-SIG-A2 to the QBPSK constellation to further indicate that HE-SIG-B is not present in the preamble.

5. The device of claim 1, wherein, when the HE-SIG-A is repeated and includes four HE-SIG-A symbols, the logic is to interleave the first and third symbols, the second and fourth symbols not being interleaved.

6. The device of claim 1, further including a transceiver coupled to the MAC circuitry and the PHY circuitry to transmit and receive wireless signals, the transceiver including a low-noise amplifier and an analog-to-digital converter.

7. The device of claim 6, further including a processor, a memory, and one or more antennas coupled to the transceiver.

8. A non-transitory computer-readable medium storing computer-executable instructions which, when executed by a processor, cause the processor to perform operations including:

generating a high efficiency data frame having a preamble, the preamble including a legacy signal field (L-SIG), a repeated L-SIG field (R-L-SIG), a high efficiency signal field A (HE-SIG-A), a high efficiency short training field (HE-STF), and a high efficiency long training field (HE-LTF), R-L-SIG being a repetition of L-SIG in a time domain, HE-SIG-A to include a first high efficiency signal A symbol (HE-SIG-A1) and a second high efficiency signal A symbol (HE-SIG-A2);

determining a value of a length field of the L-SIG such that the value of the length field divided by 3 has a remainder value of 1 or 2, wherein the remainder value being equal to a first remainder value of 1 or 2 is to indicate that HE-SIG-A is not repeated in the preamble in the time domain and that a high efficiency signal field B (HE-SIG-B) is not present in the preamble, and the remainder value being equal to a second remainder value of 1 or 2 otherwise, the first remainder value being different from the second remainder value; and causing transmission of the data frame;

wherein, to indicate that HE-SIG-A is not repeated, the instructions, when executed by the processor, are to cause the processor to perform operations including mapping HE-SIG-Al and HE-SIG-A2 onto a binary phase shift keying (BPSK) constellation.

9. The non-transitory computer-readable medium of claim 8, wherein:

HE-SIG-A further includes a third high efficiency signal A symbol (HE-SIG-A3), and a fourth high efficiency signal A symbol (HE-SIG-A4); and to indicate that HE-SIG-A is repeated, the instructions, when executed by the processor, are to cause the processor to perform operations including mapping HE-SIG-Al onto a binary phase shift keying (BPSK) constellation, and mapping HE-SIG-A2 onto a quadrature binary phase shift keying (QBPSK) constellation, wherein the QBPSK constellation is different from the BPSK constellation.

10. The non-transitory computer-readable medium of claim 8, wherein, when the remainder value is equal to a second remainder value:

to indicate that HE-SIG-A is not repeated and that HE-SIG-B is present in the preamble, the instructions, when executed by the processor, are to cause the processor to perform operations including mapping HE-SIG-A2 to a binary phase shift keying (BPSK) constellation; and to indicate that HE-SIG-A is repeated, the instructions, when executed by the processor, are to cause the processor to perform operations including mapping HE-SIG-A2 to a quadrature binary phase shift keying (QBPSK) constellation the QBPSK constellation being different from the BPSK constellation.

11. The non-transitory computer-readable medium of claim 10, wherein the instructions, when executed by the processor, are to cause the processor to perform operations including mapping HE-SIG-A2 to the QBPSK constellation to further indicate that HE-SIG-B is not present in the preamble.

12. The non-transitory computer-readable medium of claim 8, wherein, when HE-SIG-A is repeated and includes four HE-SIG-A symbols, the instructions, when executed by the processor, are to cause the processor to perform operations including interleaving the first and third symbols, the second and fourth symbols not being interleaved.

13. A wireless device including medium access control (MAC) circuitry and physical layer (PHY) circuitry coupled to the MAC circuitry, the MAC circuitry and PHY circuitry having logic to:

decode a high efficiency data frame having a preamble, the preamble including a legacy signal field (L-SIG) having a length field, a repeated L-SIG field (R-L-SIG), a high efficiency signal field A (HE-SIG-A), a high efficiency short training field (HE-STF), and a high efficiency long training field (HE-LTF), wherein HE-SIG-A includes a first high efficiency signal A symbol (HE-SIG-A1) and a second high efficiency signal A symbol (HE-SIG-A2);

determine that HE-SIG-A is not repeated and that a high efficiency signal field B (HE-SIG-B) is not present in the preamble if a remainder value of the length field divided by three is equal to a first remainder value of 1 or 2;

determine that HE-SIG-A is repeated or that HE-SIG-B is present in the preamble if the remainder value is equal to a second remainder value of 1 or 2, the second remainder value being different from the first remainder value;

determine that HE-SIG-A is not repeated by detecting that HE-SIG-A1 and HE-SIG-A2 are mapped onto a binary phase shift keying (BPSK) constellation; and decode the data frame based on determining whether HE-SIG-A is repeated and whether HE-SIG-B is present in the preamble.

14. The device of claim 13, wherein the logic is further to determine the remainder value.

15. The device of claim 13, wherein:

HE-SIG-A includes a third high efficiency signal A symbol (HE-SIG-A3), and a fourth high efficiency signal A symbol (HE-SIG-A4); and the logic is to further determine that HE-SIG-A is repeated by detecting that HE-SIG-A1 is mapped onto a binary phase shift keying (BPSK) constellation and that HE-SIG-A2 is mapped onto a quadrature binary phase shift keying (QBPSK) constellation, wherein the QBPSK constellation is different from the BPSK constellation.

16. The device of claim 13, wherein:

the logic is to determine that HE-SIG-A is not repeated and that HE-SIG-B is present in the preamble by detecting that the remainder value is equal to the second remainder value and that HE-SIG-A2 is mapped onto a binary phase shift keying (BPSK) constellation; and the logic is to determine that HE-SIG-A is repeated by detecting that the remainder value is equal to the second remainder value and that HE-SIG-A2 is mapped onto a quadrature binary phase shift keying (QBPSK) constellation, wherein the QBPSK constellation is different from the BPSK constellation.

17. The device of claim 16, wherein the logic is to determine that HE-SIG-B is not present in the preamble by detecting that HE-SIG-A2 is mapped onto the QBPSK constellation.

18. The device of claim 13, further including a transceiver coupled to the MAC circuitry and the PHY circuitry to transmit and receive wireless signals, the transceiver including a low-noise amplifier and an analog-to-digital converter.

19. The device of claim 18, further including a processor, a memory, and one or more antennas coupled to the transceiver.

20. A method to be performed at a wireless device, the method comprising:

decoding a high efficiency data frame having a preamble, the preamble including a legacy signal field (L-SIG) having a length field, a repeated L-SIG field (R-L-SIG), a high efficiency signal field A (HE-SIG-A), a high efficiency short training field (HE-STF), and a high efficiency long training field (HE-LTF), wherein HE-SIG-A includes a first high efficiency signal A symbol (HE-SIG-A1) and a second high efficiency signal A symbol (HE-SIG-A2);

determining that HE-SIG-A is not repeated and that a high efficiency signal field B (HE-SIG-B) is not present in the preamble if a remainder value of the length field divided by three is equal to a first remainder value of 1 or 2;

determining that HE-SIG-A is repeated or that HE-SIG-B is present in the preamble if the remainder value is equal to a second remainder value of 1 or 2, the second remainder value being different from the first remainder value;

determining that HE-SIG-A is not repeated by detecting that HE-SIG-A1 and HE-SIG-A2 are mapped onto a binary phase shift keying (BPSK) constellation; and decoding the data frame based on determining whether HE-SIG-A is repeated and whether HE-SIG-B is present in the preamble.

21. The method of claim 20, further including determining the remainder value.

22. The method of claim 20, wherein:

HE-SIG-A includes a third high efficiency signal A symbol (HE-SIG-A3), and a fourth high efficiency signal A symbol (HE-SIG-A4); and the method further includes determining that HE-SIG-A is repeated by detecting that HE-SIG-Al is mapped onto a binary phase shift keying (BPSK) constellation and that HE-SIG-A2 is mapped onto a quadrature binary phase shift keying (QBPSK) constellation, wherein the QBPSK constellation is different from the BPSK constellation.

23. The method of claim 20, further including:

determining that HE-SIG-A is not repeated and that HE-SIG-B is present in the preamble by detecting that the remainder value is equal to the second remainder value, and that HE-SIG-A2 is mapped onto a binary phase shift keying (BPSK) constellation; and determining that HE-SIG-A is repeated by detecting that the remainder value is equal to the second remainder value, and that HE-SIG-A2 is mapped onto a quadrature binary phase shift keying (QBPSK) constellation, wherein the QBPSK constellation is different from the BPSK constellation.

24. The method of claim 23, further including determining that HE-SIG-B is not present in the preamble by detecting that HE-SIG-A2 is mapped onto the QBPSK constellation.

25. The method of claim 20, wherein, when HE-SIG-A is repeated and includes four HE-SIG-A symbols, the first and third symbols are interleaved, and the second and fourth symbols are not interleaved.

* * * * *